T. B. FORD.
VALVE.
APPLICATION FILED MAR. 31, 1919.
1,316,539.
Patented Sept. 16, 1919.
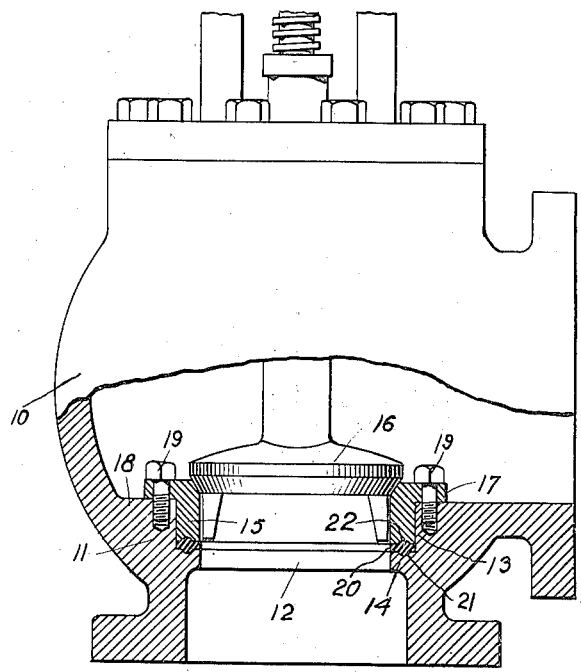
WITNESSES
INVENTOR
THOMAS B. FORD
BY
ATTORNEYS

UNITED STATES PATENT OFFICE.

THOMAS BURTON FORD, OF WHITE PLAINS, NEW YORK.

VALVE.

1,316,539.　　　　　Specification of Letters Patent.　　Patented Sept. 16, 1919.

Application filed March 31, 1919. Serial No. 286,379.

*To all whom it may concern:*

Be it known that I, THOMAS B. FORD, a citizen of the United States, and a resident of White Plains, in the county of Westchester and State of New York, have invented new and useful Improvements in Valves, of which the following is a full, clear, and exact description.

The invention relates to valves for controlling steam, water or other liquids and gases, and its object is to provide certain new and useful improvements in valves whereby a valve seat that has become defective can be readily renewed or interchanged without requiring alteration of the valve body. Another object is to dispense with the use of screw threads now generally employed for fastening a valve seat of brass or composition in position in the web of the valve body. Another object is to eliminate corrosion due to the effect of water especially salt water on the joint between the valve seat and the valve seat opening in the web of the valve body.

With these and other objects in view the invention consists of certain novel features of construction as hereinafter shown and described and then specifically pointed out in the claims.

A practical embodiment of the invention is represented in the accompanying drawings forming a part of this specification, in which the figure is a sectional side elevation of the improved valve with a portion shown in elevation.

The valve body 10 is provided with a web or partition 11 having an opening 12 for the passage of the fluid passing through the valve. The wall of the opening 12 is provided with an enlarged portion 13 forming with the wall of the opening 12 an annular shoulder 14. Into the recess 13 fits a valve seat 15, preferably made of brass or other non-corrosive composition in contradistinction to the iron or steel of which the body 10 is made. A valve 16 of usual construction and controlled in the usual manner is adapted to be seated on the valve seat 15. The valve seat 15 is fitted into the recess 13 with an ordinary easy fit and the valve seat 15 is provided with a flange 17 seated on the upper surface 18 of the web or bridge 11, and through the flange 17 pass stud bolts 19 screwing into the web or partition 11 to securely fasten the valve seat 15 in place on the said web or partition 11. The lower end of the valve seat 15 is spaced from the shoulder 14 and into this space fits a compressible packing 20 of rubber or other suitable material not liable to be affected by the fluid passing through the valve seat. The opposite faces of the shoulder 14 and the valve seat 15 are preferably provided with annular grooves 21 and 22 into which passes a portion of the packing 20 to provide an exceedingly tight joint between the valve seat 15 and the shoulder 14 thereby preventing fluid from reaching the joint between the outer face of the valve seat 15 and the wall of the recess 13. It will also be noticed that when the valve 16 moves into position on the seat 15 then the strain is taken up by the flange 17 seated on the face 18 of the partition 11 and as the flange 17 has a lead on the shoulder 14 it is evident that the packing 20 is not affected by the bounding incident to the valve 16 moving onto its seat. It will further be noticed that by the arrangement described the valve seat 15 in case it becomes defective can be readily removed by unscrewing the stud bolts 19 and replaced by a new one fastened in place by the same stud bolts 19.

It will be noticed that by the arrangement described a valve seat when worn out can be readily replaced by a new one without requiring any alteration in the valve body, and the joint between the valve seat and the valve opening in the web of the valve body is not affected by the corrosive influence of salt water or other liquid or gas that passes through the valve and hence a worn out valve seat can be readily replaced by a new one.

It is understood that valve seats screwed into the web and having the threads exposed to the deleterious influence of salt water or other liquid or fluid cannot readily be renewed unless new threads are provided in the web of the valve body.

Having thus described my invention, I claim as new and desire to secure by Letters Patent:—

1. In a valve, a valve body, provided with a partition having a seat opening, the wall of which is provided with an annular recess thereby forming an annular shoulder, a valve seat fitting into the said recess, the said valve seat having a flange seated on the face of the partition in advance of the seating of the valve seat on the said annular shoulder, a packing interposed between the said annular shoulder and the bottom of the said valve seat, and stud bolts passing through the seat flange and screwing into the partition to fasten the valve seat in position on the partition.

2. In a valve, a valve body provided with a partition having a seat opening, the wall of which is provided with an annular recess thereby forming an annular shoulder, a valve seat fitting into the said recess, the said valve seat having a flange seated on the face of the said partition in advance of the seating of the valve seat on the said annular shoulder, the said annular shoulder and the bottom of the valve seat having annular registering grooves, a packing interposed between the said shoulder and the said valve seat bottom and engaging in the said grooves, and stud bolts passing through the said valve seat flange and screwing into the said partition.

THOMAS BURTON FORD.